United States Patent Office 3,285,119
Patented Nov. 15, 1966

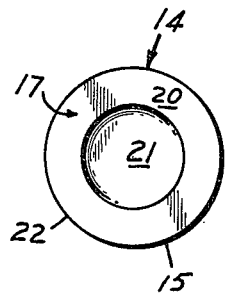
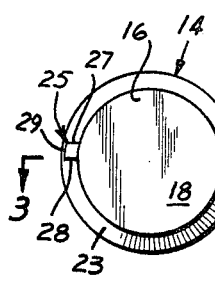
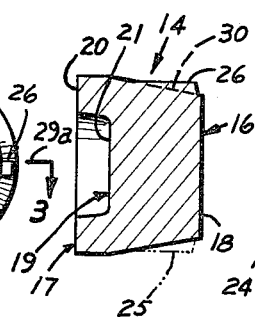
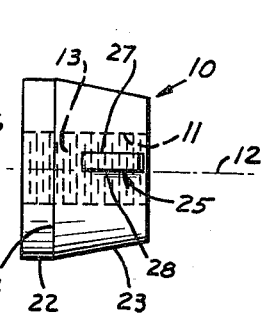
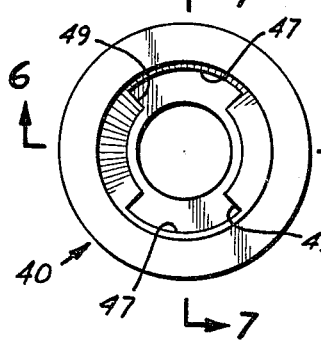
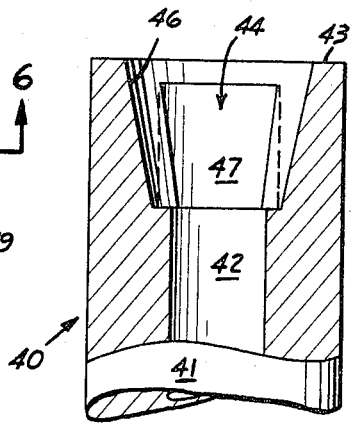
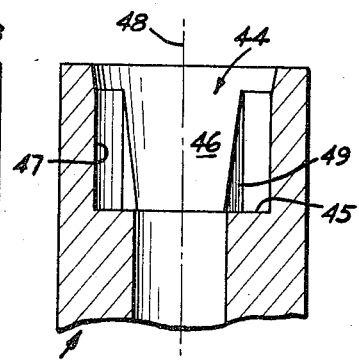
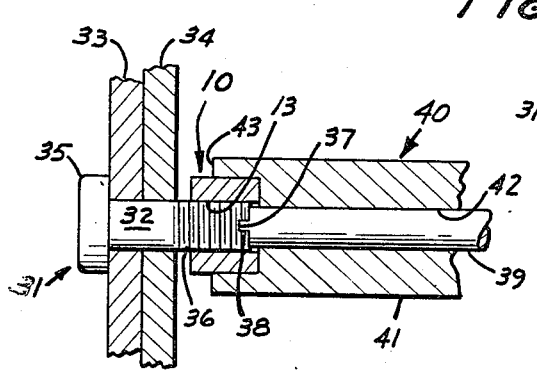
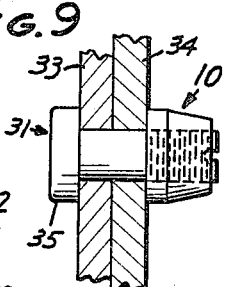
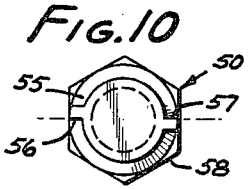
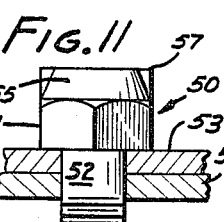

3,285,119
TORQUE-LIMITING FASTENER
John F. Dean, Dallas, Tex., and Ronald W. Batten, Torrance, Calif., assignors to Hi-Shear Corporation, Torrance, Calif., a corporation of California
Filed May 5, 1964, Ser. No. 368,758
1 Claim. (Cl. 85—61)

This invention relates to threaded fasteners.

The combination of a headed bolt and a nut is one of the most conventional types of fasteners known, and is widely used. Particularly, in highly stressed applications, it is a matter of considerable importance that in the installation process, a predetermined torque be applied to the nut in order that the clamping force exerted between the head of the bolt and the nut be of some desired level which is, or should be, proportional to the torque exerted on the nut. It is always a matter of concern that the workmen may or may not have actually applied the correct torque to a particular nut, and means have therefore been sought which would provide both inherent torque limitation, and also provide visual means to indicate that torque at that level has actually been exerted. The same criteria apply when the fastener system is set by driving the head of the bolt and holding the nut against rotation.

One well-known type of inherently torque-limiting and indicating nut is shown in George S. Wing Patent No. 2,940,495 entitled, "Fastener." In this device, a driving portion is provided on the nut which is separated from the threaded portion of the nut by a groove which occupies the position of least cross-sectional area along the fastener, whereby the driving portion will shear off when a given torque is exerted thereon. This has proved to be a very successful device, but because the area of the shear section is annular, and can therefore vary widely in cross-sections with minor differences of inside and outside diameters, a careful dimensional control must be exercised in the manufacture of this device, and therefore it is made on a lathe or screen machine, which processes are relatively expensive. This device is, in fact, expensive enough that it is not widely used for automotive bodies and the like.

It is an object of this invention to provide a threaded fastener with inherently self-limiting torque features and indicating features which can readily be manufactured by heading operations instead of by the more expensive turning operations, and whose tolerances are well within those generally less critical tolerances found in land vehicle and other commercial type fields.

It is a further object of this invention to provide a fastener driving system which enables the fastener of the invention to be driven rapidly and conveniently.

A torque-limiting fastener according to this invention comprises a head having a central axis and coaxial threads, such as inside an axial passageway, or on the outside of an axial shank integral with the head. An outer peripheral surface is formed on the head, this surface being a surface of revolution which is centered on the central axis. A driving lug is formed integral with the fastener on and interrupting the surface of revolution. A shear plane is formed near the intersection of the driving lug and the surface of revolution, whose shear strength defines the upper limit of torque which is applicable to the head by tangential forces exerted on the driving lug. Shearing of this lug destroys the capability of the head to be driven, and also indicates that a given amount of torque has been exerted on it.

According to a preferred but optional feature of this invention, a plurality of driving lugs is provided, the lugs being symmetrically disposed around the central axis and offset from a diametral line.

According to still another preferred but optional feature of this invention, the head is formed from a headed blank which comprises a body having a central axis with a first and a second end, there being a planar surface at the first end lying normal to the central axis, and a dimpled face lying normal to the central axis at the second end. A conical surface of revolution is formed contiguous to the first end, and a cylindrical surface of revolution is formed contiguous to the second end, these surfaces of revolution intersecting closer to the second end than to the first end. A lug is formed on and interrupting the conical surface of revolution, this lug having a pair of spaced-apart parallel sides and an outer edge which tapers inwardly toward the first end and intersects the two parallel sides. This blank is entirely formed by heading.

According to still another preferred but optional feature of the invention, a bolt is provided which has a head and a threaded end, and the special head is formed on a nut. Torque-resisting means, preferably but not necessarily a transverse slot, are formed in the bolt at its threaded end.

According to still another preferred but optional feature of this invention, a driver is provided for setting the combination of the nut and bolt described in the paragraph next above, which driver comprises a body having an axis of rotation, there being an opening in the first end defined by a base surface and a sidewall. The base surface is adapted to contact the first end of the nut, and the first portion of the sidewall is adapted to embrace the surface of revolution adjacent to the first end of the nut. A recess is formed in the sidewall to receive the lug, a shoulder being formed at the junction of the recess and said first portion of the sidewall to accomplish the engagement.

The above and other features of this invention will be fully understood from the following detailed description and the accompanying drawings in which:

FIG. 1 is a bottom view of a blank from which a nut having a head according to this invention may be made;

FIG. 2 is a top view of the blank shown in FIG. 1;

FIG. 3 is a cross-section taken at line 3—3 of FIG. 2;

FIG. 4 is a side view of a completed nut;

FIG. 5 is an end view of a driver suitable for driving the device of this invention;

FIG. 6 is a cross-section taken at line 6—6 of FIG. 5;

FIG. 7 is a cross-section taken at line 7—7 of FIG. 5;

FIGS. 8 and 9 are side elevations, partly in cutaway cross-section, showing the presently preferred embodiment of the invention in the process of being set, and subsequent to being set, respectively; and FIGS. 10 and 11 are top and cross-section views of still another embodiment of the invention.

FIG. 4 shows the presently preferred embodiment of torque-limiting nut 10 according to the invention. The nut forms a "head" for a fastener. It is formed up from the blank illustrated in FIGS. 1–3, and differs from the blank shown therein by the fact that a hole 11 extending along the central axis 12 has been formed, which includes threads 13.

The nut and blank 14 both are formed up from a body 15 which has a first and second end 16, 17, respectively. First end 16 has a flat usrface 18 which lies normal to the central axis of the nut. Second end 17 of the blank has a dimpled surface 19 which includes an annular flat portion 20 and a dimple 21 receding into the body, centered on the circular axis. Surface 19 lies generally normal to the central axis.

The blank includes a cylindrical peripheral portion 22 which is contiguous to the second end and a substantially conical peripheral portion 23 which is contiguous to the first end, these portions meeting at a circular intersection 24. Portions 22 and 23 are both surfaces of revolution.

Two driving lugs 25, 26 are formed integral with the body, and intersect and are integral with surface of revolution 23. As can best be seen in FIGS. 3 and 4, the lugs are identical, and each has a pair of spaced-apart parallel sides 27, 28, which intersect and are bounded by an outer edge 29. The outer edge tapers gently inwardly toward the first end by an amount sufficient to give an acceptable amount of draft so that the blank can readily be ejected from a header. This angle is somewhat exaggerated in FIG. 3 for purposes of illustration. These lugs are offset from a diametral line 29a, surfaces 28 preferably being aligned with it. This provides a more direct, tangential drive between a driver and the lugs.

This blank is readily struck off in a common header, either cold or hot, and forms its components to very close tolerances suitable for use without further machining except for the drilling and tapping of the central hole 11.

A shear plane 30 is formed near the intersection of the lugs and the surface of revolution. It is approximately equal in area to the cross-section of the lug as a continuation of the surface of revolution. However, when the lug actually shears off, it will be found that a small protrusion may remain slightly above the surface of revolution, whereby the actual shear plane may be somewhat laterally displaced from the theoretical path of the surface of revolution.

This nut is used in combination with a bolt 31 which has a shank 32 adapted to pass through aligned holes in two workpieces 33, 34, for example. The bolt has a headed and a threaded end, there being a head 35 at its threaded end, and threads 36 at its threaded end. In order that this fastener may be installed by tightening operations conducted from a single side of the work, a transverse slot 37 is provided in the threaded end which serves as torque-resisting means able to be grasped by the tang 38 of a torquing member 39.

A driver 40, which is uniquely suited to driving nut 10, is shown in FIGS. 5–7. This driver constitutes an essentially circular body 41 having a central passage 42 passing therethrough. This passage passes torquing member 39 so that they can counter-rotate relative to each other. A torquing member and driver of these classes may conveniently be attached to driving tools which exert counter-rotative forces such as those shown in United States patents to Wing Nos. 3,041,902 and 2,882,773.

At a first end 43 of body 41, there is an opening 44 having a generally bell-mouthed shape. This opening includes a base surface 45 which is generally annular and is adapted to engage with the first end of the nut when it is inserted into the opening. A sidewall 46 partially bounds the opening and has the shape of a fragment of a surface of revolution identical to portion 23 of the nut so as to support and embrace it. A recess 47 is bounded by still another portion of sidewall 46. This recess extends substantially parallel to the central axis 48 of the opening and is bounded by a shoulder 49 which faces in the driving direction so as to engage a lug thereby to turn the nut. The shoulder intersects sidewall 46 at about the shear plane of the nut when the nut is inside the opening.

FIGS. 10 and 11 illustrate that the special head, comprising surface of revolution and lugs may be placed on the bolt instead of on the nut. In these figures, bolt 50 includes a head 51, a threaded shank 52 adapted to pass through holes in plates 53, 54. The head includes a surface of revolution 55, and lugs 56, 57 which are identical to those of FIG. 4.

FIGS. 10 and 11 also illustrate the use of fastener-engaging surfaces 58, such as a hexagonal array, on the head below the surface of revolution, which enables torque to be applied and release the fastener after it is set. This configuration is readily headed, and can be used on the nut of FIG. 4 as well as on the head of a bolt as in FIGS. 10 and 11.

The driving of the fasteners of FIGS. 4 and 10 is identical. The only difference is that in FIGS. 4 and 8, the bolt is held against rotation, and in FIGS. 10 and 11, the nut is held against rotation.

The use of the aforesaid fastener, fastener system and driver should be evident from what has been said above. However, it is shown in complete detail in FIGS. 8 and 9, where bolt 31 is shown extending through workpieces 33 and 34 to be joined and held together by clamping forces exerted by head 35 and nut 10. In order to accomplish this setting operation, tang 38 of torquing member 39 is placed in transverse slot 37, and the opening of the driver is placed over the nut with the lugs in recesses 47. Then holding torquing member 39 against rotation and turning the driver relative to it will move the nut along the threads of the bolt. Finally, when the nut and the head are drawn tightly against the workpieces, torque will build up to the limiting value at which time the lugs will shear off, and the driver and torquing member may be removed.

It is evident that the ultimate torque developed by this system is determined by the strength of the material of the nut and by the area of the shear plane in the lugs.

It will be observed from the foregoing that this nut is readily formed by heading and that the only dimensions which must be held quite closely are the spacing between parallel sides 27 and 28 of the lugs, and the length of the lug because these establish the area of the shear plane which must be overcome in order for the lugs to shear off. These dimensions are easily controlled in a header. Also, the general shape of the nut is one easily formed in the heading operation. The result is an inexpensive nut with torque limitation and indicating means, which heretofore have been available only in more expensive fasteners. All elements of the nut may be readily formed in the heading process except for the drilling and tapping of the central hole.

This invention is not to be limited by the embodiments shown in the drawings and described in the description which are given by way of example and not of limitation, but only in accordance with the scope of the appended claim.

We claim:

A torque-limiting fastener adapted to be driven to a predetermined, inherently limited, torque level, comprising: a head having a central axis and an axial thread thereon; an outer peripheral surface on said head, said surface being a substantially frusto-conical surface centered on said central axis; and a pair of longitudinally disposed driving lugs integral with the head, on and interrupting said frusto-conical surface and being circumferentially spaced apart approximately 180°, said driving lugs being defined by a pair of parallel tool-engaging side surfaces and an outer end surface lying radially within the maximum diameter of the head, each of said driving lugs lying entirely on opposite sides of the diametral line passing through the central axis with one side surface of each lug being substantially aligned with said diametral line to provide a substantially direct, tangential drive between the driver and the lugs, each of said driving lugs forming near their intersection with the frusto-conical surface, a shear plane whose shear strength defines the upper limit of torque applicable to the nut by tangential forces exerted on the driving lugs, shearing of the lugs at that plane destroying the capability of the head to be driven, said shear planes defining the minimum cross-sectional areas of the fastener subject to direct shear.

References Cited by the Examiner

UNITED STATES PATENTS

| | | | |
|---|---|---|---|
| 1,188,305 | 6/1916 | Noeteman | 85—45 |
| 1,229,240 | 6/1917 | Day. | |
| 1,506,500 | 8/1924 | Ripamonti et al. | 85—45 |

(Other references on following page)

UNITED STATES PATENTS

| | | | |
|---|---|---|---|
| 1,696,523 | 12/1928 | Cochran | 85—61 |
| 1,956,963 | 5/1934 | Salmen | 85—45 |
| 2,050,464 | 8/1936 | Robinson | 85—61 |
| 2,054,060 | 9/1936 | Morris | 85—61 |
| 2,741,339 | 4/1956 | Barton | 85—32 |

FOREIGN PATENTS 584,527    9/1933    Germany.

CARL W. TOMLIN, *Primary Examiner.*

R. S. BRITTS, *Assistant Examiner.*